(12) United States Patent
Buddhiraju et al.

(10) Patent No.: US 11,513,373 B2
(45) Date of Patent: Nov. 29, 2022

(54) ANISOTROPIC DIFFRACTION GRATING AND WAVEGUIDE

(71) Applicant: Facebook Technologies, LLC, Menlo Park, CA (US)

(72) Inventors: Siddharth Buddhiraju, Redwood, WA (US); Yu Shi, Redmond, WA (US); Ningfeng Huang, Redmond, WA (US); Hee Yoon Lee, Kirkland, WA (US); Pasi Saarikko, Kirkland, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 400 days.

(21) Appl. No.: 16/704,637

(22) Filed: Dec. 5, 2019

(65) Prior Publication Data

US 2021/0173234 A1    Jun. 10, 2021

(51) Int. Cl.
| | |
|---|---|
| *G02B 27/14* | (2006.01) |
| *G02F 1/00* | (2006.01) |
| *F21V 8/00* | (2006.01) |
| *G02B 27/01* | (2006.01) |
| *G02F 1/13363* | (2006.01) |

(52) U.S. Cl.
CPC ......... *G02F 1/0063* (2013.01); *G02B 6/0016* (2013.01); *G02B 27/0172* (2013.01); *G02F 1/133634* (2013.01); *G02B 2027/0178* (2013.01)

(58) Field of Classification Search
CPC .............. G02B 6/0016; G02B 27/0172; G02B 2027/0178; G02F 1/0063; G02F 1/133634
USPC ............................................ 359/630; 345/7–9
See application file for complete search history.

(56) References Cited

U.S. PATENT DOCUMENTS

2019/0285796 A1    9/2019   Walder et al.

FOREIGN PATENT DOCUMENTS

WO    2019185510    10/2019

OTHER PUBLICATIONS

PCT/US2020/058038 Search Report dated Jan. 28, 2021.
International Preliminary Report for International Application No. PCT/US2020/058038, dated Jun. 16, 2022, 8 pages.

*Primary Examiner* — William Choi
(74) *Attorney, Agent, or Firm* — Pequignot + Myers; Matthew A. Pequignot (57) ABSTRACT

A diffraction grating includes a substrate and a plurality of fringes supported by the substrate. The fringes run parallel to each other in a first direction. A refractive index of a material of the plurality of fringes is anisotropic, whereby a refractive index contrast of the diffraction grating depends on direction of electric field of an impinging light beam, and through that dependence is a function of an azimuthal angle of the impinging light beam. A dependence of the diffraction efficiency on the azimuthal angle is affected by the dependence of the refractive index contrast on the direction of electric field of an impinging light beam. A pupil-replicating waveguide may use such a diffraction grating as a coupler for in- our out-coupling image light.

14 Claims, 11 Drawing Sheets

ANISOTROPIC DIFFRACTION GRATING AND WAVEGUIDE

TECHNICAL FIELD

The present disclosure relates to displays and wearable headsets, and in particular to components and modules for wearable visual display headsets.

BACKGROUND

Head mounted displays (HMD), helmet mounted displays, near-eye displays (NED), and the like are being increasingly used for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can appear three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain. Such images can be observed by a user's eye directly, without an intermediate screen or a display panel. The lack of a screen or a display panel in a scanning projector display enables size and weight reduction of the display. An imaging waveguide, also termed a pupil-replicating waveguide, may be used to extend image light carrying the image in angular domain over an eyebox of the display. Pupil-replicating waveguides have angle and position-dependent optical loss, which may result in a non-uniform illumination of the eyebox area with image light.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 2A, 6A, 7A, and 8A, similar reference numerals denote similar elements.

Pupil-replicating waveguides may use diffraction grating couplers for in-coupling the image light into the waveguides, and/or for out-coupling the image light towards an eyebox of a near-eye display, i.e. to a geometrical area where the generated image of an acceptable quality may be observed by the user's eye. An in-coupling diffraction grating coupler changes the direction of propagation of an external image light such that the light may be coupled into the waveguide, e.g. for propagation by total internal reflection (TIR). An out-coupling diffraction grating coupler changes the direction of propagation of the waveguide-bound light to propagate out of the waveguide and towards the eyebox.

The efficiency of light coupling by diffraction grating couplers depends on many factors, including angular dependence of the diffraction efficiency of the in- and out-couplers, the geometry of the waveguide, the number of bounces of the light beam from the waveguide surface, etc. It may be desirable to be able to control the angular dependence of the diffraction efficiency by design, i.e. by selecting geometry and/or materials of the diffraction grating couplers. In particular, it is desirable to tune the angular selectivity of the coupling efficiency of a diffraction grating coupler.

In accordance with the present disclosure, birefringent materials may be used to provide a polarization-dependent, i.e. anisotropic, refractive index contrast of a diffraction grating. Since the diffraction efficiency depends on the refractive index contrast, the diffraction efficiency of such anisotropic gratings becomes highly dependent on the azimuthal angle of incidence, whereby different azimuthal angles of incidence exhibit different electric field polarizations and thereby experiences different refractive index contrast values. For example, the diffraction grating lines, or fringes, may be formed of an optically anisotropic material with an optic axis having an acute angle to the diffraction grating lines. Alternatively or in addition, the diffraction grating and/or filling material of the diffraction grating lines may be optically anisotropic. This provides an extra degree of freedom in constructing a diffraction grating with a desired pre-determined angular dependence of the diffraction grating efficiency.

In accordance with the present disclosure, there is provided a diffraction grating comprising a substrate and a plurality of fringes supported by the substrate and running parallel to each other in a first direction. A refractive index of a material of the plurality of fringes is anisotropic, whereby a refractive index contrast of the diffraction grating is anisotropic. Fringes of the plurality of fringes may extend at an acute angle to the substrate. In some embodiments, the material includes a uniaxial birefringent material having an optic axis. The optic axis may extend parallel to the substrate, and may form an acute angle with the first direction. The substrate may be transparent for visible light.

In accordance with the present disclosure, there is provided a pupil-replicating waveguide comprising a substrate for propagating image light therein, and a diffraction grating coupler supported by the substrate for in-coupling or out-coupling the image light. The diffraction grating coupler includes a plurality of fringes running parallel to each other in a first direction, wherein a refractive index of a material of the plurality of fringes is anisotropic, whereby a refractive index contrast of the diffraction grating coupler is anisotropic. The material may be optically anisotropic, e.g. the material may include a birefringent material having an optic axis. The optic axis may extend parallel to the substrate, and may form an acute angle with the first direction.

The optically anisotropic material may be e.g. a liquid crystal material and/or a birefringent crystal. In some embodiments, the optically anisotropic material comprises nematic liquid crystals. The optically anisotropic material may include a birefringent crystal, e.g. lithium niobate, silicon carbide, rutile, etc. Fringes of the plurality of fringes may extend from the substrate at an acute angle to the substrate. The pupil-replicating waveguide may further include a layer filling gaps between the fringes of the plurality of fringes.

In accordance with the present disclosure, there is further provided a near-eye display (NED) comprising an image source for providing image light carrying an image in angular domain. A pupil-replicating waveguide, e.g. any of the pupil-replicating waveguide embodiments described above, is optically coupled to the image source and configured to provide the image light to an eyebox of the NED.

Figure 1A:
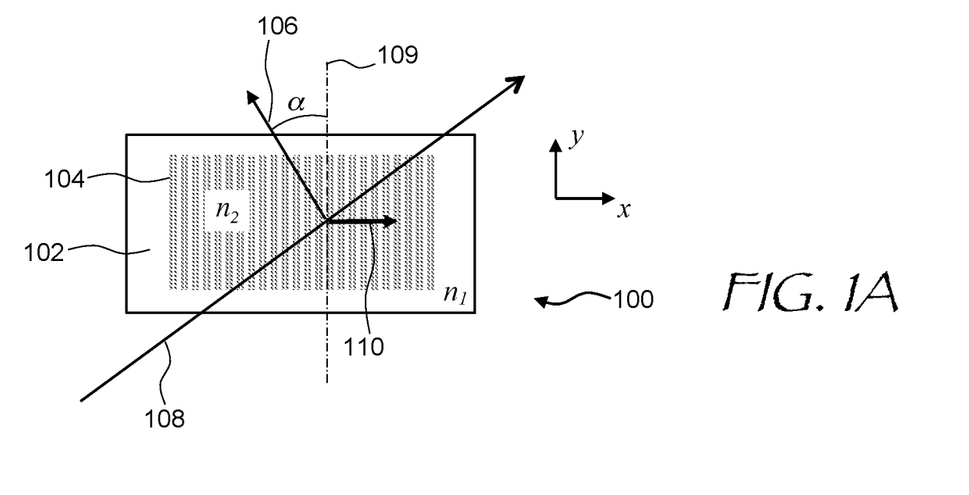
FIG. 1A is a plan view of a diffraction grating having anisotropic refractive index contrast.

Referring now to FIG. 1A, a diffraction grating 100 includes a substrate 102 and a plurality of fringes 104 supported by the substrate 102 and running parallel to each other in XY plane along Y axis. Herein, the term "running parallel to each other" includes embodiments where the fringes may turn or meander while remaining parallel to each other. The fringes 104 may be formed on the substrate 102 and/or in the substrate 102. In this example, the substrate 102 has an optically isotropic refractive index $n_1$. The fringes 104 include an optically anisotropic material, i.e. a uniaxial birefringent material having a refractive index tensor $n_2$. With such a uniaxial birefringent tensor, the magnitude of the refractive index experienced by a light beam 108 varies with the angle $\alpha$ between the electric field vector 106 and the optical axis 109 of the anisotropic material. In FIG. 1, the optic axis 109 extends along Y axis and is perpendicular to a wave vector 110 of the diffraction grating 100, which extends along X axis.

The dependence $n_2(\alpha)$ causes a refractive index contrast within the diffraction grating 100, defined as a modulus of difference between the refractive index of the fringes 104 and inter-fringe areas (which may be filled with a filling material), to be dependent on the angle $\alpha$. Generally, one of, or both of refractive indices of the substrate 102 and the fringes 104 may be optically anisotropic.

Figure 1B:
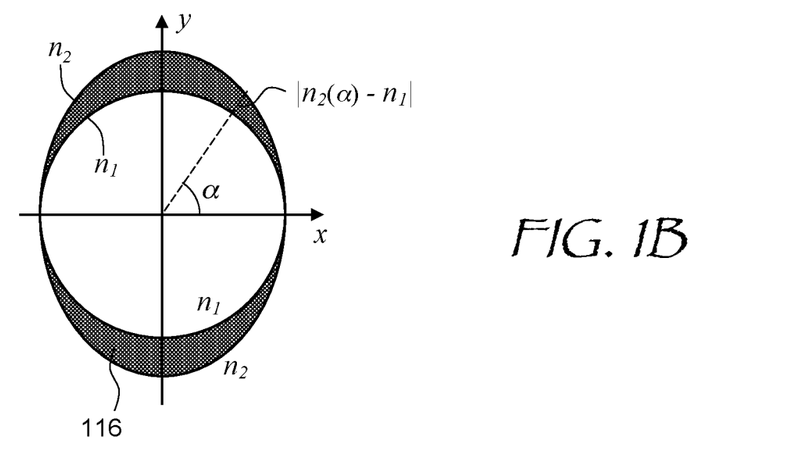
FIG. 1B is a refractive index diagram of the fringes and the fringe filling material of the diffraction grating of FIG. 1A.
Figure 1C:
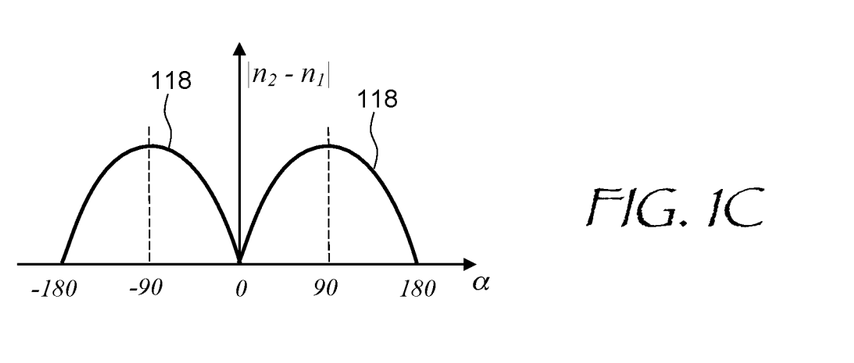
FIG. 1C is a plot of refraction index contrast vs. electric field direction of a light beam impinging onto the diffraction grating of FIG. 1A.

As an exemplary illustration, the fringes 109 in FIG. 1A may include materials with two distinct refractive indices, e.g. isotropic refractive index $n_1$ of a material filling spaces between the fringes 104 and anisotropic refractive index $n_2$ of the fringes 104. In FIG. 1B, grating refractive indices $n_1$ and $n_2$ are plotted together as a function of the angle $\alpha$. Since refractive index $n_1$ is optically isotropic, its dependence on the angle $\alpha$ is represented by a circle. The other fringe refractive index $n_2$ is uniaxially anisotropic, and accordingly is represented by an ellipse. The refractive index contrast $|n_2(\alpha)-n_1|$ is represented by a width of a shaded area 116 in the direction defined by the angle $\alpha$, as shown. FIG. 1C shows a dependence 118 of the refractive index contrast $|n_2(\alpha)-n_1|$ on the angle $\alpha$. The refractive index contrast $|n_2(\alpha)-n_1|$ reaches maxima at $\alpha=-90$ degrees and $\alpha=90$ degrees, as shown.

Figure 2A:
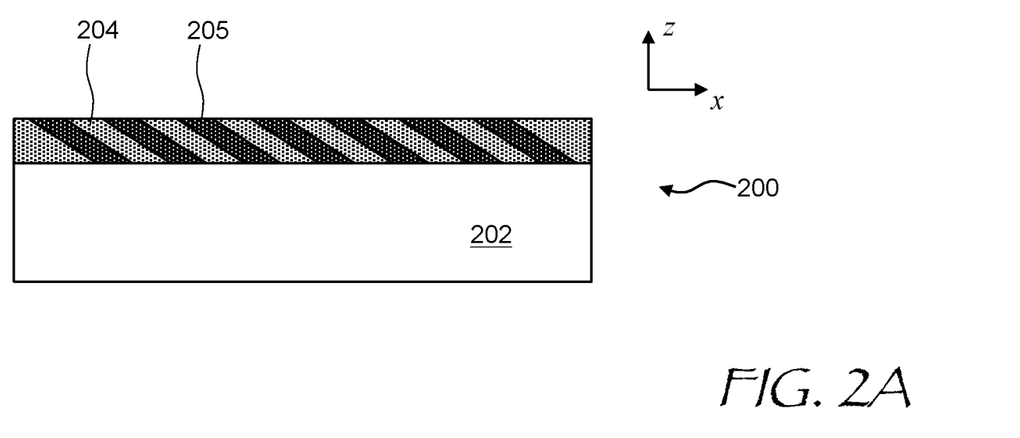
FIG. 2A is a side cross-sectional view of a diffraction grating with fringes at an angle to the substrate.

Turning to FIG. 2A, a diffraction grating 200 includes a substrate 202 and a plurality of fringes 204 supported by the substrate 202 and extending generally upwards, i.e. in the direction of Z axis, at an acute angle to the substrate 202. In some embodiments, the fringes 204 may also extend perpendicular to the substrate 202, i.e. parallel to Z axis. The fringes 204 may include a uniaxial or a biaxial birefringent material, with optic axis (or axes, as the case may be) parallel or at an angle w.r.t. the substrate 202, and/or parallel or at an angle w.r.t. the fringes 204. The substrate 202 may be optically isotropic, or may be optically anisotropic, i.e. birefringent. In some embodiments, gaps between the fringes 204 may be filled with an optically isotropic material forming a filling layer 205. The filling layer 205 material may also be isotropic or anisotropic, with a different direction of optic axis (or axes) than the material of the fringes 204 to provide anisotropic refractive index contrast. In some embodiments, the refractive index of the filling layer 205 is substantially equal to the refractive index of the substrate 202.

Figure 2B:
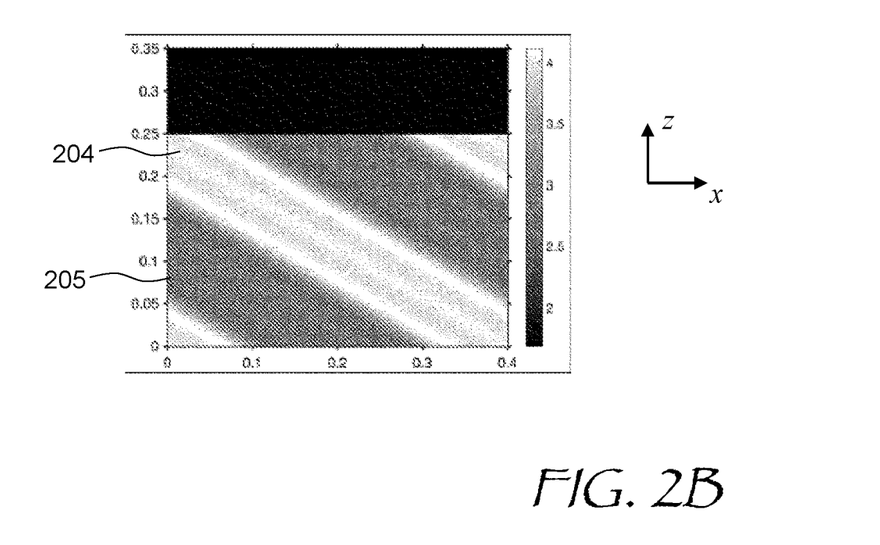
FIG. 2B is a cross section of a dielectric constant profile, which is the square of the refractive index profile, of the diffraction grating of FIG. 2A.

FIG. 2B is an exemplary refractive index map of the fringes 204. In the refractive index map of FIG. 2B, dark-shaded areas correspond to low refractive index, and light-shaded areas correspond to a high refractive index. In this example, the refractive index of the fringes 204 is higher than the refractive index of the filling layer 205.

Figure 3:
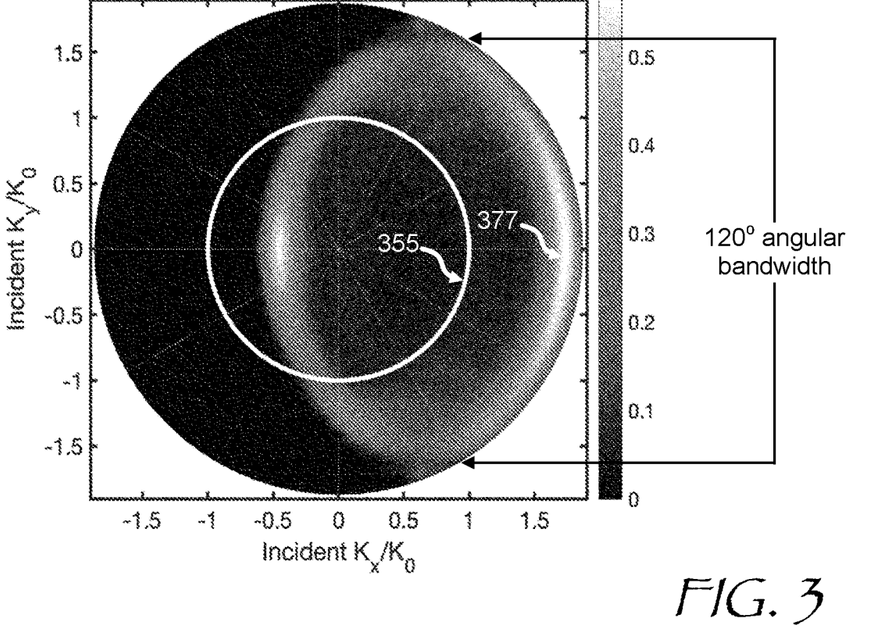
FIG. 3 is a two-dimensional map of a computed efficiency of diffraction into a $-1^{st}$ diffraction order of an embodiment of the diffraction grating of FIGS. 2A and 2B having isotropic refractive index of the substrate and the fringes.

Referring now to FIG. 3, efficiency of reflective diffraction into a $-1^{st}$ diffraction order has been computed for an embodiment of the diffraction grating 200 having isotropic refractive index $n_2$=2.0 of the fringes 204 and isotropic refractive index $n_1$=1.65 of the filling layer 205 and the substrate 202. The diffraction efficiency is plotted against $K_x$ and $K_y$ wave vector components of the impinging light beam, normalized by a wave vector of the impinging light beam in air, $K_0$. A length of a wave vector is inversely proportional to the wavelength. Since the wavelength of a light beam propagating in a dense medium with a refractive index greater than unity is shorter than the wavelength of the same light beam in air, the length of the wave vector in the dense medium normalized by the wave vector length in air is larger than unity; a unity circle 355 in FIG. 3 (white color) represents the vector $K_0$. It is seen that, for a blazed oblique angle of incidence, the diffraction efficiency of a central lobe 377, corresponding to the blazing direction of the diffraction grating 200 with tilted fringes 204, is of a comparatively high magnitude (greater than 0.4) over about ±60 degrees of the azimuthal angle of the impinging light beam 108. The diffraction efficiency diagram of FIG. 3 will be used for comparing with diffraction efficiency diagrams of optically anisotropic diffraction gratings considered further below.

Figure 4:
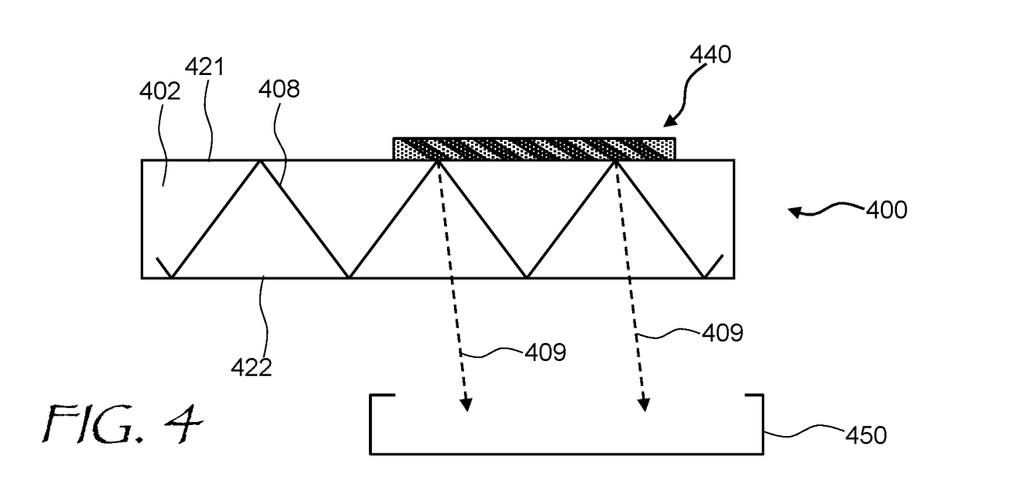
FIG. 4 is a side cross-sectional view of a pupil-replicating waveguide including a diffraction grating coupler based on a diffraction grating of this disclosure.

One application of a diffraction grating of this disclosure is to use it as a coupler of image light into a pupil-replicating waveguide of a near-eye display, or out of the waveguide. The out-coupler application is illustrated in FIG. 4. An image light beam 408 propagates in a substrate 402 of a pupil-replicating waveguide 400. The substrate 402 is transparent to visible light. The image light beam 408 propagates in the substrate 402 in a zigzag pattern by undergoing total internal reflection (TIR) from top 421 and bottom 422 surfaces of the substrate 402, as shown in FIG. 4. A diffraction grating 440 is similar to the diffraction grating 200 of FIGS. 2A and 2B, and to the diffraction grating 100 of FIG. 1A. The diffraction grating 440 diffracts a portion 409 of the light beam 408 each time the light beam 408 impinges onto the diffraction grating 440, thereby expanding the light beam portions 409 over an eyebox 450, i.e. from left to right in FIG. 4. To make sure that the light beam 408 expansion over the eyebox 450 has a high overall efficiency and is uniform across the eyebox 450 and the field of view of the near-eye display (i.e. across different angles of incidence), the diffraction efficiency needs to have a certain optimal diffraction efficiency angular profile, depending upon the geometry used, number of gratings used, etc.

Figure 5A:
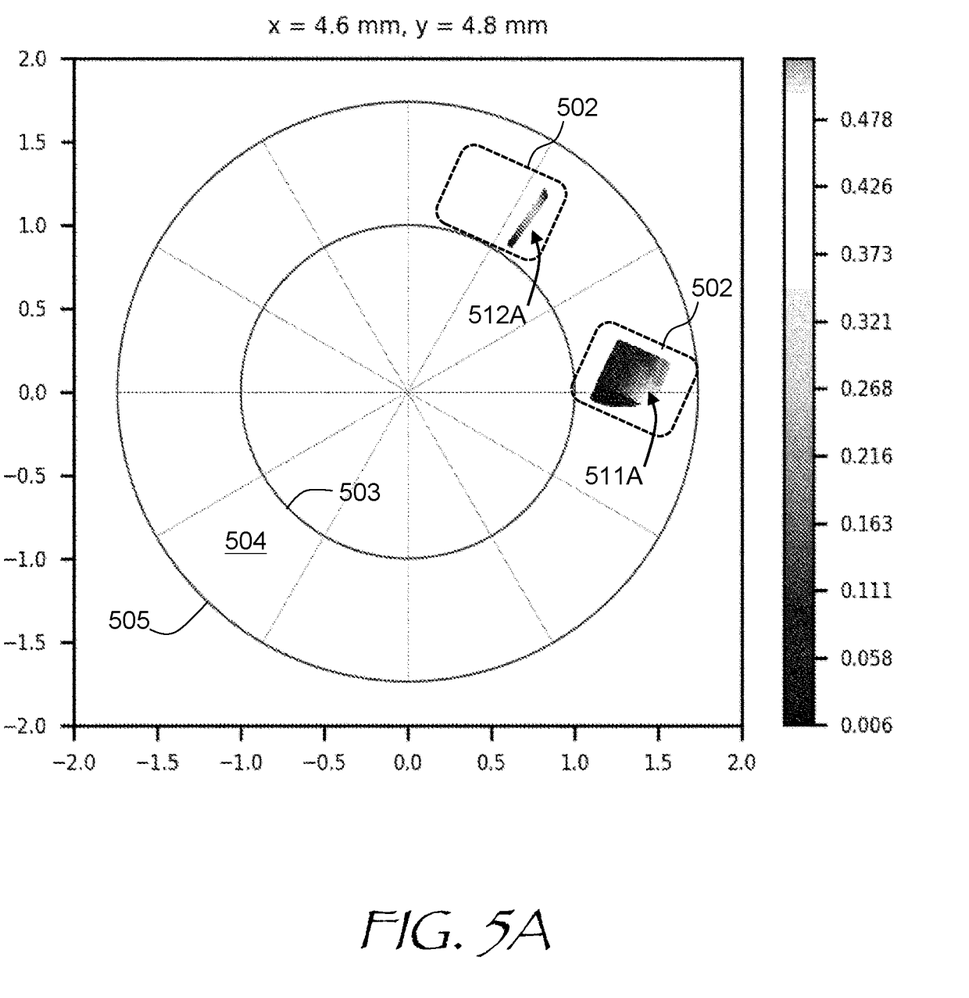
FIGS. 5A and 5B are examples of computed target maps of diffraction efficiency of the diffraction grating coupler as a function of wave vector of incident light, at different locations of the pupil-replicating waveguide. Each waveguide location requires different diffraction efficiencies to provide a more uniform angular distribution of the image light conveyed by the pupil-replicating waveguide of FIG. 4.
Figure 5B:
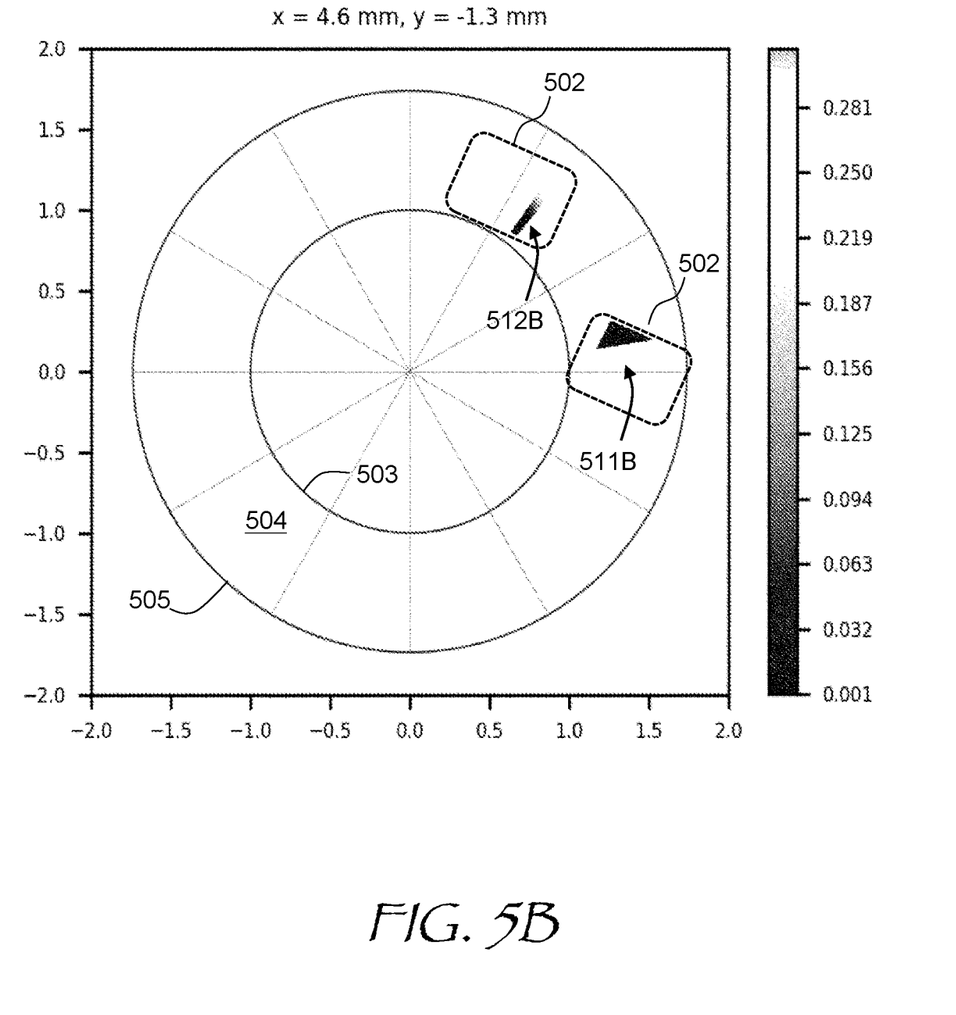

Non-limiting examples of such optimal angular profiles of the diffraction efficiency are illustrated in FIGS. 5A and 5B. Referring first to FIG. 5A, an output diffraction grating of the pupil-replicating waveguide 400 of FIG. 4 is configured to diffract light having a wave vector falling within dashed rectangles 502 (FIG. 5A). The dashed rectangles 502 are disposed within a donut-shaped area 504, which is limited from the inside by TIR critical incidence angle circle 503 and an outer circle 505 defined by the waveguide geometry. A wave vector of an image light beam impinging onto the diffraction grating 440 at any location of the diffraction grating 440 falls within one of the two dashed rectangles 502. Within these rectangles 502, depicted are optimal first 511A and second 512A diffraction efficiency profiles. The optimal diffraction efficiency profiles 511A and 512A provide optimal optical performance of the pupil-replicating waveguide 400. Both optimal diffraction efficiency profiles 511A and 512A are highly non-uniform, with the first profile 511A requiring a higher overall diffraction efficiency, and the second profile 512A 511A requiring a lower overall diffraction efficiency. Optimal diffraction efficiencies may vary across the surface of a diffraction grating coupler; for example, the diffraction efficiency profiles 511A and 512A of FIG. 5A correspond to the coordinate x=4.6 mm, y=4.8 mm, whereas diffraction efficiency profiles 511B and 512B of FIG. 5B correspond to the coordinate x=4.6 mm, y=−1.3 mm.

More generally, in two-dimensional (2D) pupil replication waveguides, each output diffraction grating may perform two functions: splitting the light beam by diffraction for 1D pupil replication of guided modes, or out-coupling the light beam by diffraction. One parameter that distinguishes these two functions is the azimuthal angle at which light is impinging on the output diffraction grating. Ideally, a control of the splitting and out-coupling diffraction needs to be performed independently. Having anisotropic diffraction gratings with azimuthal angle selectivity provides another degree of freedom for configuring an overall angular response of the output diffraction grating.

Figure 6A:
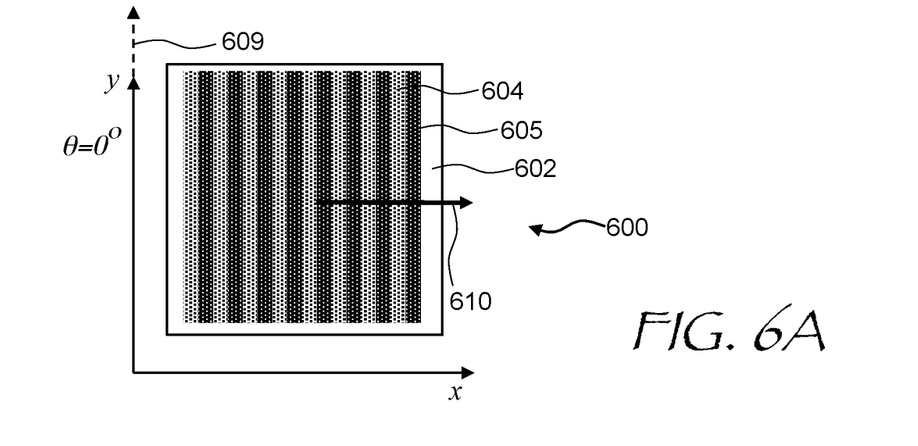
FIG. 6A is a top view of a diffraction grating coupler having an anisotropic refractive index contrast, with optic axis parallel to grating fringes.

Several non-limiting examples of birefringent diffraction gratings having anisotropic refractive index contrast will now be considered. Referring first to FIG. 6A, a diffraction grating 600 includes a plurality of fringes 604 supported by a substrate 602 and running along Y axis, i.e. vertically in FIG. 6A. A filling layer 605 fills spaces or gaps between the fringes 604. The fringes 604 extend at a straight or an acute angle w.r.t. the substrate 602, similarly to the fringes 204 of the diffraction grating 200 of FIG. 2A. Refractive index of a material of the fringes 604 is anisotropic, i.e. the refractive index is a function of a direction of electric field of an impinging light beam. In this example, the material of the fringes 604 is a uniaxial optically anisotropic material having an optic axis 609 parallel to the substrate 602 and extending perpendicular to a diffraction grating vector 610 of the diffraction grating 600, i.e. parallel to the direction of fringes 604 running parallel to Y axis. The diffraction grating vector 610 is parallel to X axis. An angle θ between the fringes 604 and the optic axis 609 is 0 degrees in this example. For an electric vector of the linearly polarized impinging light beam extending in a direction of the optic axis 609, the refractive index is 2.0; in a perpendicular direction the refractive index is selected to be 1.65, equal to that of the filling layer 605. The refractive index of the substrate 602 is isotropic and has a value of 1.9. Accordingly, the grating refractive index contrast is 0.35 for the linearly polarized impinging light beam with the electric vector extending along Y axis, and is zero for the linearly polarized light beam with the electric vector extending along X axis.

Figure 6B:
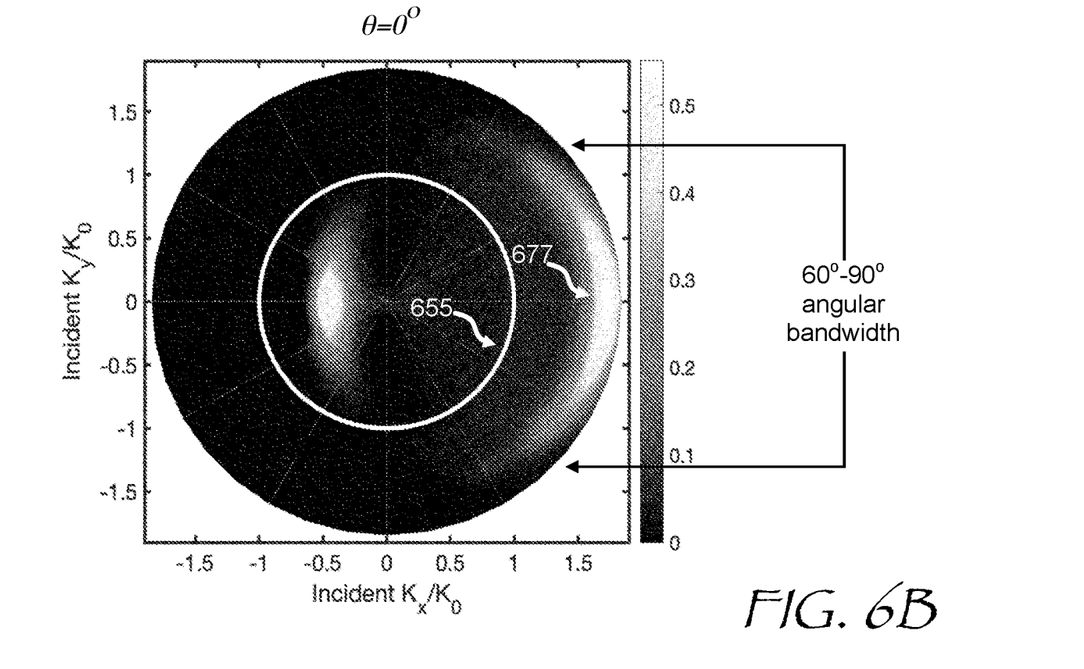
FIG. 6B is a two-dimensional map of a computed diffraction efficiency into a $-1^{st}$ diffraction order of the diffraction grating coupler of FIG. 6A.

Turning to FIG. 6B, efficiency of reflective diffraction of a light beam into a $-1^{st}$ diffraction order is computed vs. the K-vector components $K_x$, $K_y$ for the diffraction grating 600 of FIG. 6A. A unity circle 655 (white color) represents the K-vector in air $K_0$. The impinging light beam is linearly polarized, with the electric field vector parallel to the substrate 602 and perpendicular to the plane of incidence of the light beam onto the diffraction grating 600. For the light beam impinging along x-axis, $K_y$=0, and the electric field vector is parallel to Y axis, that is, parallel to the optic axis 609, and accordingly the refractive index contrast is at the maximum value of 0.35. For the light beam impinging at an angle to X axis, such that $K_y \neq 0$, the electric field vector forms a non-zero angle with Y axis, that is, a non-zero angle with the optic axis 609, and therefore the refractive index contrast is less than the maximum value of 0.35. Since the diffraction efficiency typically increases with an increase of the refractive index contrast and decreases with a decrease of the refractive index contrast, the diffraction efficiency for non-zero angle with the optic axis 609 will be less than if the refractive index of the fringes 604 were isotropic.

The effect of reduction of diffraction efficiency for light beams impinging at an acute angle w.r.t. the x-axis can be seen more clearly by comparing FIG. 6B with FIG. 3, which corresponds to a same diffraction grating geometry, but with the isotropic refractive indices of the fringes, at the same nominal values of the refractive index. One can see that the birefringence of the fringes 604 with the optic axis 609 oriented along y-axis results in narrowing of the angular width of the diffraction efficiency of a central lobe 677, corresponding to the blazing direction of the diffraction grating 600 with tilted fringes 604. The angular width is reduced from ±60 degrees (FIG. 3) to a smaller value of around ±30 degrees (FIG. 6B). In this manner, the birefringence of the fringes 604 enables tuning an angular dependence of the diffraction efficiency with the purpose of matching the diffraction grating efficiency with the desired angular dependence illustrated in FIGS. 5A and 5B more closely. It is to be noted that the diffraction grating efficiency may be tuned for any other purpose, i.e. the present disclosure is not limited to only pupil-replicating waveguides application.

Figure 7A:
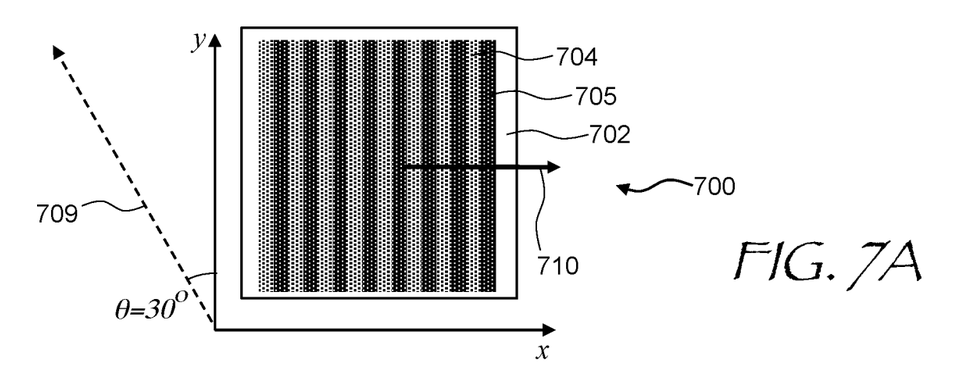
FIG. 7A is a top view of a diffraction grating coupler having an anisotropic refractive index contrast, with optic axis at 30 degrees to the grating fringes.

Referring to FIG. 7A, a diffraction grating 700 is similar to the diffraction grating 600 of FIG. 6A, but has a different direction of an optic axis 709 of birefringence of the fringes material. Briefly, the diffraction grating 700 includes a plurality of fringes 704 supported by a substrate 702 and running along Y axis. A filling layer 705 fills spaces between the fringes 704. A grating vector 710 extends perpendicular to the direction of the fringes 704.

The material of the fringes 704 is a uniaxial optically anisotropic material with the optic axis 709 parallel to the substrate. An angle B between the fringes 704 and the optic axis 709 is 30 degrees in this example. For an electric vector of the linearly polarized impinging light beam extending in a direction of the optic axis 709, the refractive index is 2.0; in a perpendicular direction the refractive index is selected to be equal to that of the substrate 702 and the filling layer 705. The refractive index of the filling layer 705 and the substrate 702 is isotropic, and has a value of $n_2=1.65$. Accordingly, the refractive index contrast is 0.35 for the linearly polarized impinging light beam with the electric vector extending at 30 degrees w.r.t. Y axis, and is zero for the linearly polarized light beam with the electric vector extending at −60 degrees w.r.t. Y axis.

Figure 7B:
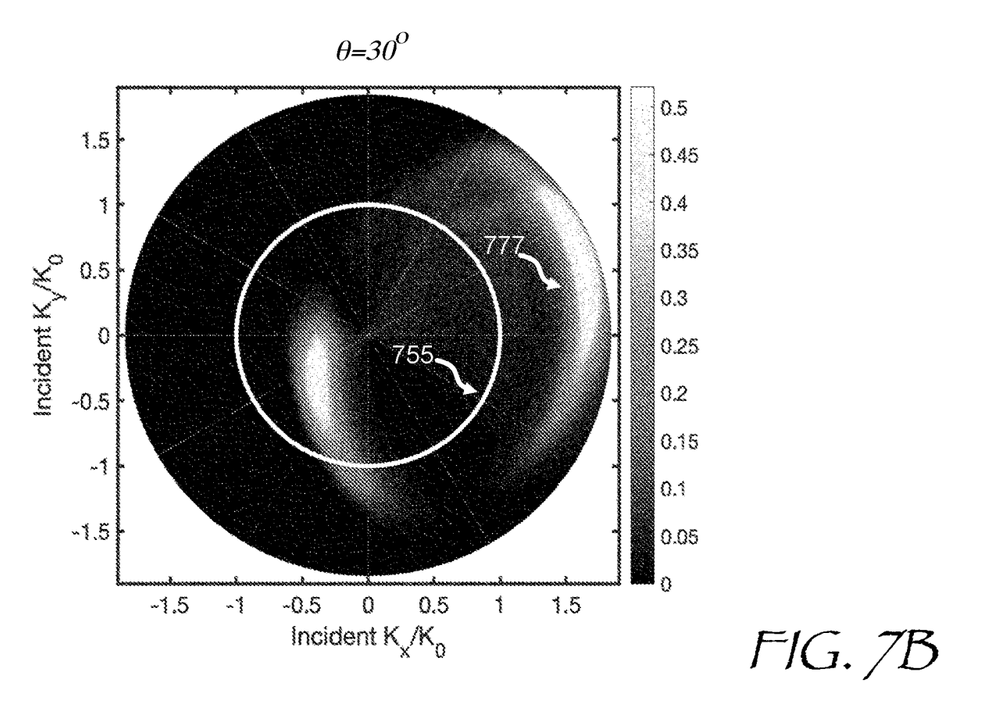
FIG. 7B is a two-dimensional map of a computed diffraction efficiency into a $-1^{st}$ diffraction order of the diffraction grating coupler of FIG. 7A.

Referring to FIG. 7B, efficiency of reflective diffraction of a light beam into a $-1^{st}$ diffraction order is computed vs. the K-vector components $K_x$, $K_y$ for the diffraction grating 700 of FIG. 7A. A unity circle 755 (white color) represents the vector $K_0$. The impinging light beam is linearly polarized, with the electric field vector parallel to the substrate 702 and perpendicular to the plane of incidence of the light beam onto the diffraction grating 700 (i.e. s-polarized).

The effect of changing a direction of an optic axis of the fringes material may be observed by comparing FIG. 7B with FIG. 6B. For the light beam impinging at 30 degrees to x-axis, the electric field vector is parallel to the optic axis 709 and accordingly the diffraction efficiency in a main lobe 777 is at maximum (FIG. 7B). This results in a shift of the main lobe 777, as compared with the position of the main lobe 677 in FIG. 6B, by about 20 degrees.

Figure 8A:
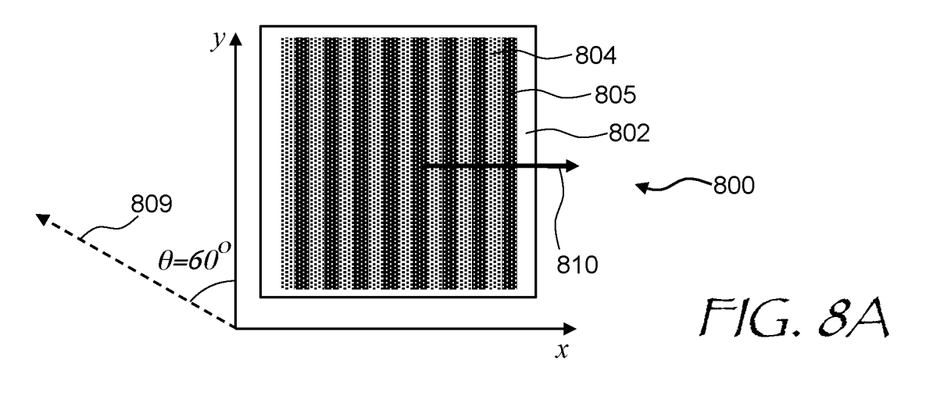
FIG. 8A is a top view of a diffraction grating coupler having an anisotropic refractive index contrast, with optic axis at 60 degrees to the grating fringes.
Figure 8B:
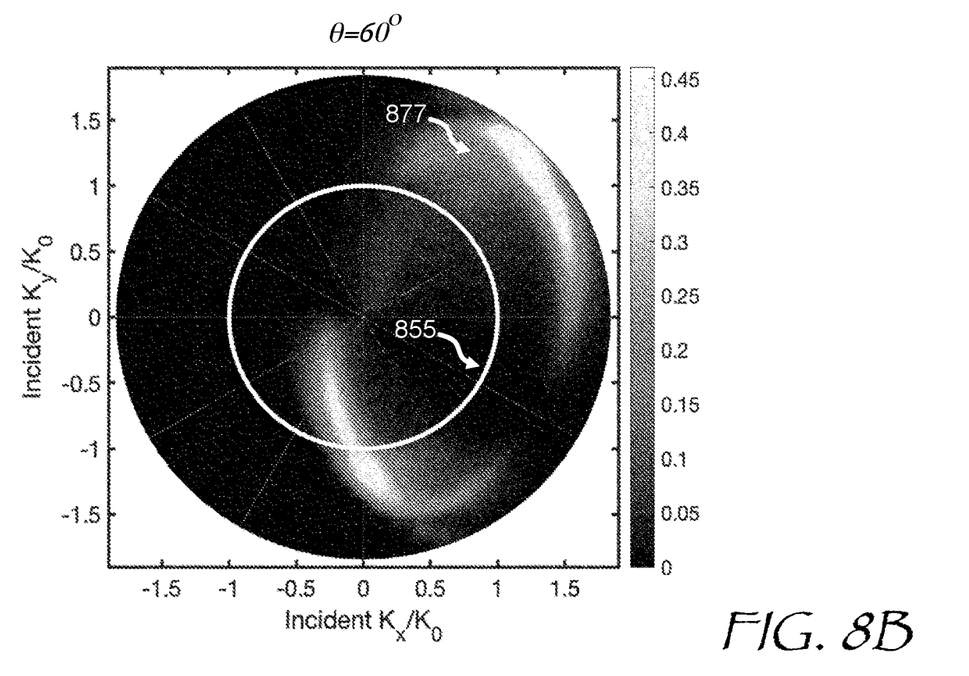
FIG. 8B is a two-dimensional map of a computed diffraction efficiency into a $-1^{st}$ diffraction order of the diffraction grating coupler of FIG. 8A.

The effect of tuning the diffraction efficiency angular distribution is further illustrated in FIGS. 8A and 8B. Referring to FIG. 8A, a diffraction grating 800 is similar to the diffraction grating 700 of FIG. 7A, but has a different direction of an optic axis 809 of birefringence of the fringes material. Briefly, the diffraction grating 800 includes a plurality of fringes 804 supported by a substrate 802 and running along Y axis. A filling layer 805 fills spaces between the fringes 804. A grating vector 810 extends perpendicular to the direction of the fringes 804.

The material of the fringes 804 is a uniaxial optically anisotropic material with the optic axis 809 parallel to the substrate. An angle θ60 between the fringes 804 and the optic axis 809 is 60 degrees in this example. For an electric vector of the linearly polarized impinging light beam extending in a direction of the optic axis 809, the refractive index is 2.0; in a perpendicular direction the refractive index is selected to be equal to that of the substrate 802 and the filling layer 805. The refractive index of the filling layer 805 and the substrate 802 is isotropic, and has a value of $n_2=1.65$. Accordingly, the refractive index contrast is 0.35 for the linearly polarized impinging light beam with the electric vector extending at 60 degrees w.r.t. Y axis, and is zero for the linearly polarized light beam with the electric vector extending at −30 degrees w.r.t. Y axis.

Referring now to FIG. 8B, efficiency of reflective diffraction of a light beam into a $-1^{st}$ diffraction order is computed vs. the K-vector components $K_x$, $K_y$ for the diffraction grating 800 of FIG. 8A. A unity circle 855 (white color) represents the K-vector in air $K_0$. The impinging light beam is linearly polarized, with the electric field vector parallel to the substrate 802 and perpendicular to the plane of incidence of the light beam onto the diffraction grating 800 (i.e. s-polarized).

The effect of changing a direction of an optic axis of the fringes material may be observed by comparing FIG. 8B with FIG. 7B and FIG. 6B. For the light beam impinging at 60 degrees to x-axis, the electric field vector is parallel to the optic axis 809 and accordingly the diffraction efficiency in a main lobe 877 is at maximum (FIG. 8B). This results in a further shift of the main lobe 877, as compared with the position of the main lobe 777 in FIG. 7B, by about 15 degrees. Thus, by selecting orientation of the optic axis (or axes, as the case may be) of the birefringent material of the diffraction grating fringes, one may tune the desired position of the diffraction efficiency lobes, and accordingly the angular distribution of the coupling efficiency of a diffraction grating coupler of a pupil-replicating waveguide.

The optically anisotropic material of the fringes 104 of the diffraction grating 100 of FIG. 1A, the fringes 204 of the diffraction grating 200 of FIG. 2A, the fringes of the diffraction grating coupler 440 of FIG. 4, the fringes 604 of the diffraction grating 600 of FIG. 6A, the fringes 704 of the diffraction grating 700 of FIG. 7A, and the fringes 804 of the diffraction grating 800 of FIG. 8A may include a uniaxial birefringent crystal, a biaxial birefringent crystal, a liquid crystal material, etc.

The liquid crystal material may include nematic liquid crystals, cholesteric liquid crystals, etc. The liquid crystal layer may be dispersed in a polymer film, either homogeneously or in form of droplets. The liquid crystal molecules may be oriented by electric field poling, by stretching the host polymer film, etc.

The birefringent materials may include, for example, lithium niobate, silicon carbide, rutile, or any other suitable birefringent crystal. The diffraction grating fringes may be formed by etching, ion milling, imprinting, and so on.

In some embodiments, the fringes of a diffraction grating may be filled with an optically anisotropic material. Alternatively or in addition, the substrate of the diffraction grating may be anisotropic. The optically anisotropic material may have positive or negative optical anisotropy, a uniaxial optical anisotropy, or a biaxial optical anisotropy. The optic axis (axes) may be oriented to provide a desired angular dependence of the refractive index contrast and associated diffraction grating efficiency. For example, the orientation of the optical axis (axes) may be selected to match a pre-determined angular distribution of in-coupling and/or out-coupling efficiency for coupling image light in and/or out of a pupil-replicating waveguide.

Figure 9:
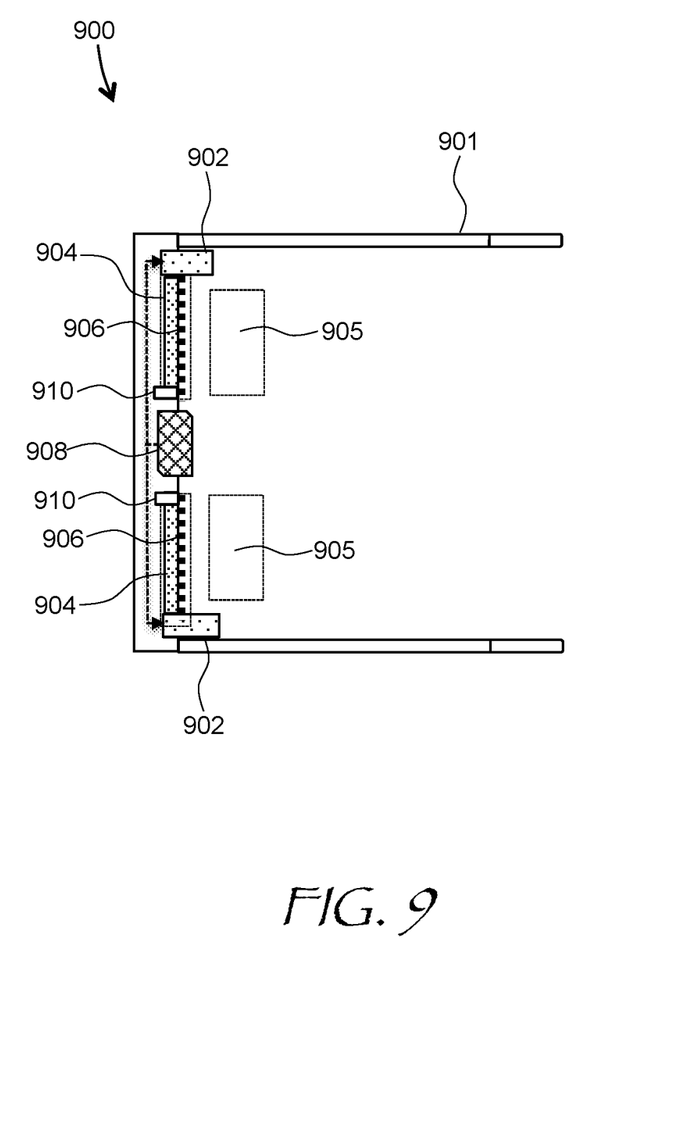
FIG. 9 is a schematic top view of a near-eye display including image-replicating waveguides with anisotropic diffraction grating couplers of this disclosure.

Turning to FIG. 9, a near-eye display (NED) 900 includes a frame 901, which may have a shape of eyeglasses. The frame 901 supports, for each eye: an image source 902 for providing image light carrying an image in angular domain, and a pupil-replicating waveguide 904 optically coupled to the image source 902 and configured to provide the image light to an eyebox 905 of the NED 900. The pupil-replicating waveguide 904 may include diffraction grating couplers 906 based on any of the diffraction gratings disclosed herein. The diffraction grating couplers 906 of the pupil-replicating waveguides 904 may have fringes comprising an optically birefringent material to provide angle-dependent refractive index contrast, as described above. Alternatively or in addition, the substrate and/or the fringes filling/planarizing layer material of the diffraction grating couplers 906 may be optically anisotropic. The optically anisotropic material(s) may be uniaxial or biaxial birefringent materials with positive or negative optical anisotropy, depending on the material used.

The NED 900 may further include a controller 908 operably coupled to the image sources 902 for providing image frames to be displayed to the left and right eyes of the user. An eye tracker 910 may be operably coupled to the controller 908 for providing a real-time information about user eye's position and/or orientation. The controller may be configured to determine the user's current gaze direction from that information, and adjust the image frames to be displayed to the user, for a more realistic immersion of the user into virtual or augmented environment.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 10A:
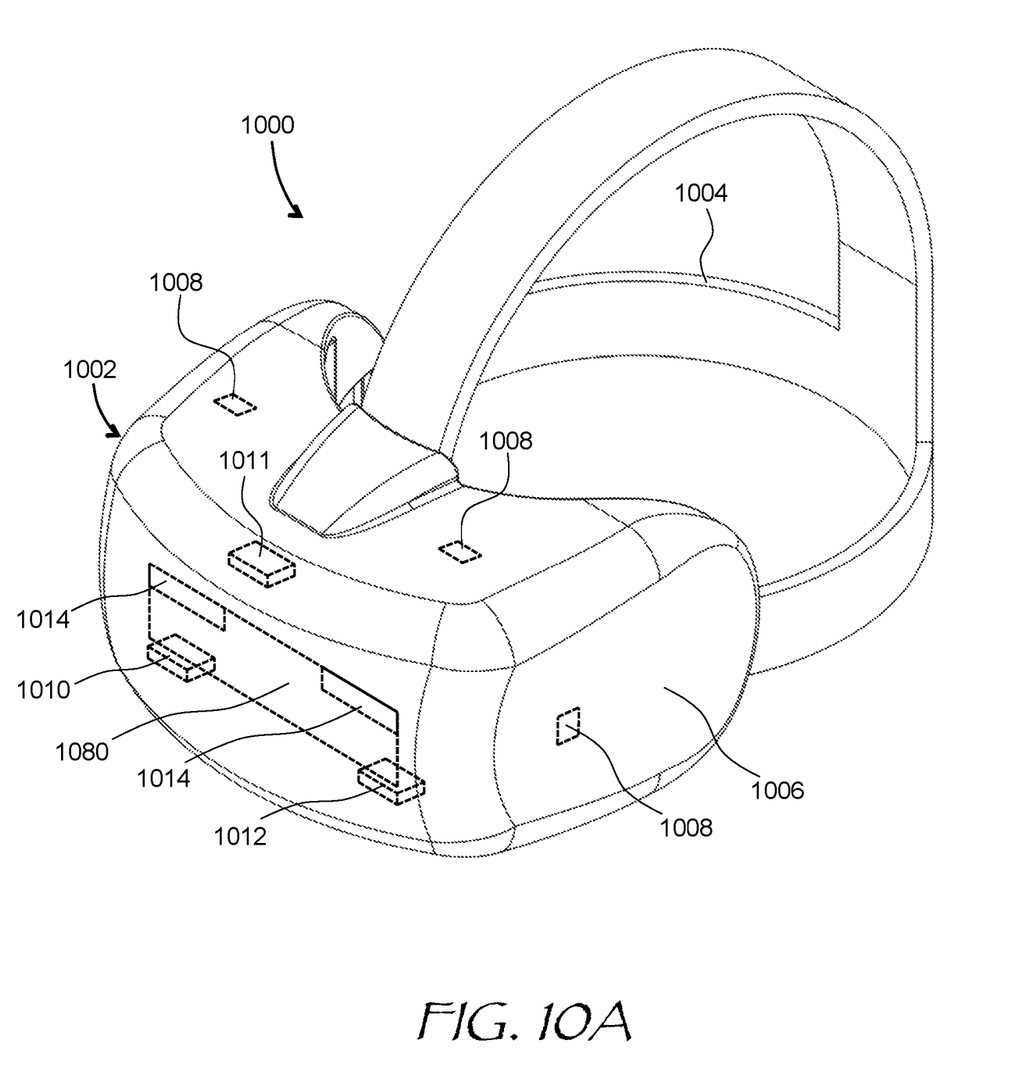
FIG. 10A is an isometric view of a head-mounted display.

Referring to FIG. 10A, an HMD 1000 is an example of an AR/VR wearable display system which encloses the user's face, for a greater degree of immersion into the AR/VR environment. The HMD 1000 is an embodiment of the near-eye display 900 of FIG. 9, for example. The function of the HMD 1000 is to augment views of a physical, real-world environment with computer-generated imagery, and/or to generate the entirely virtual 3D imagery. The HMD 1000 may include a front body 1002 and a band 1004. The front body 1002 is configured for placement in front of eyes of a user in a reliable and comfortable manner, and the band 1004 may be stretched to secure the front body 1002 on the user's head. A display system 1080 may be disposed in the front body 1002 for presenting AR/VR imagery to the user. Sides 1006 of the front body 1002 may be opaque or transparent.

In some embodiments, the front body 1002 includes locators 1008 and an inertial measurement unit (IMU) 1010 for tracking acceleration of the HMD 1000, and position sensors 1012 for tracking position of the HMD 1000. The IMU 1010 is an electronic device that generates data indicating a position of the HMD 1000 based on measurement signals received from one or more of position sensors 1012, which generate one or more measurement signals in response to motion of the HMD 1000. Examples of position sensors 1012 include: one or more accelerometers, one or more gyroscopes, one or more magnetometers, another suitable type of sensor that detects motion, a type of sensor used for error correction of the IMU 1010, or some combination thereof. The position sensors 1012 may be located external to the IMU 1010, internal to the IMU 1010, or some combination thereof.

The locators 1008 are traced by an external imaging device of a virtual reality system, such that the virtual reality system can track the location and orientation of the entire HMD 1000. Information generated by the IMU 1010 and the position sensors 1012 may be compared with the position and orientation obtained by tracking the locators 1008, for improved tracking accuracy of position and orientation of the HMD 1000. Accurate position and orientation is important for presenting appropriate virtual scenery to the user as the latter moves and turns in 3D space.

The HMD 1000 may further include a depth camera assembly (DCA) 1011, which captures data describing depth information of a local area surrounding some or all of the HMD 1000. To that end, the DCA 1011 may include a laser radar (LIDAR), or a similar device. The depth information may be compared with the information from the IMU 1010, for better accuracy of determination of position and orientation of the HMD 1000 in 3D space.

The HMD 1000 may further include an eye tracking system 1014 for determining orientation and position of user's eyes in real time. The obtained position and orientation of the eyes also allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

Figure 10B:
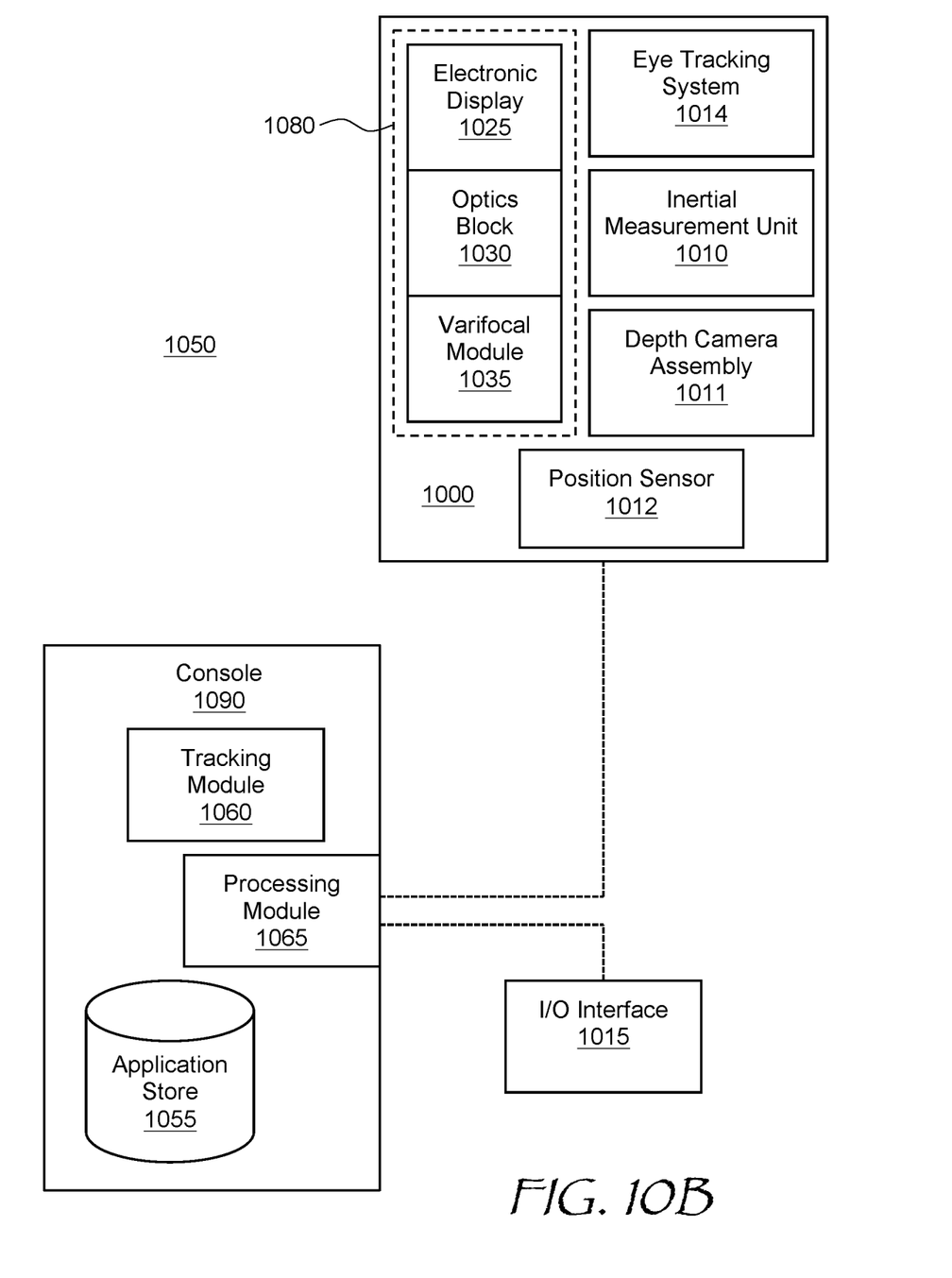
FIG. 10B is a block diagram of a virtual or augmented reality system including the headset of FIG. 10A.

Referring to FIG. 10B, an AR/VR system 1050 includes the HMD 1000 of FIG. 10A, an external console 1090 storing various AR/VR applications, setup and calibration procedures, 3D videos, etc., and an input/output (I/O) interface 1015 for operating the console 1090 and/or interacting with the AR/VR environment. The HMD 1000 may be "tethered" to the console 1090 with a physical cable, or connected to the console 1090 via a wireless communication link such as Bluetooth®, Wi-Fi, etc. There may be multiple HMDs 1000, each having an associated I/O interface 1015, with each HMD 1000 and I/O interface(s) 1015 communicating with the console 1090. In alternative configurations, different and/or additional components may be included in the AR/VR system 1050. Additionally, functionality described in conjunction with one or more of the components shown in FIGS. 10A and 10B may be distributed among the components in a different manner than described in conjunction with FIGS. 10A and 10B in some embodiments. For example, some or all of the functionality of the console 1015 may be provided by the HMD 1000, and vice versa. The HMD 1000 may be provided with a processing module capable of achieving such functionality.

As described above with reference to FIG. 10A, the HMD 1000 may include the eye tracking system 1014 (FIG. 10B) for tracking eye position and orientation, determining gaze angle and convergence angle, etc., the IMU 1010 for determining position and orientation of the HMD 1000 in 3D space, the DCA 1011 for capturing the outside environment, the position sensor 1012 for independently determining the position of the HMD 1000, and the display system 1080 for displaying AR/VR content to the user. The display system 1080 includes (FIG. 10B) an electronic display 1025, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1080 further includes an optics block 1030, whose function is to convey the images generated by the electronic display 1025 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1080 may further include a varifocal module 1035, which may be a part of the optics block 1030. The function of the varifocal module 1035 is to adjust the focus of the optics block 1030 e.g. to compensate for vergence-accommodation conflict, to correct for vision defects of a particular user, to offset aberrations of the optics block 1030, etc.

The I/O interface 1015 is a device that allows a user to send action requests and receive responses from the console 1090. An action request is a request to perform a particular action. For example, an action request may be an instruction to start or end capture of image or video data or an instruction to perform a particular action within an application. The I/O interface 1015 may include one or more input devices, such as a keyboard, a mouse, a game controller, or any other suitable device for receiving action requests and communicating the action requests to the console 1090. An action request received by the I/O interface 1015 is communicated to the console 1090, which performs an action corresponding to the action request. In some embodiments, the I/O interface 1015 includes an IMU that captures calibration data indicating an estimated position of the I/O interface 1015 relative to an initial position of the I/O interface 1015. In some embodiments, the I/O interface 1015 may provide haptic feedback to the user in accordance with instructions received from the console 1090. For example, haptic feedback can be provided when an action request is received, or the console 1090 communicates instructions to the I/O interface 1015 causing the I/O interface 1015 to generate haptic feedback when the console 1090 performs an action.

The console 1090 may provide content to the HMD 1000 for processing in accordance with information received from one or more of: the IMU 1010, the DCA 1011, the eye tracking system 1014, and the I/O interface 1015. In the example shown in FIG. 10B, the console 1090 includes an application store 1055, a tracking module 1060, and a processing module 1065. Some embodiments of the console 1090 may have different modules or components than those described in conjunction with FIG. 10B. Similarly, the functions further described below may be distributed among components of the console 1090 in a different manner than described in conjunction with FIGS. 10A and 10B.

The application store 1055 may store one or more applications for execution by the console 1090. An application is a group of instructions that, when executed by a processor, generates content for presentation to the user. Content generated by an application may be in response to inputs received from the user via movement of the HMD 1000 or the I/O interface 1015. Examples of applications include: gaming applications, presentation and conferencing applications, video playback applications, or other suitable applications.

The tracking module 1060 may calibrate the AR/VR system 1050 using one or more calibration parameters and may adjust one or more calibration parameters to reduce error in determination of the position of the HMD 1000 or the I/O interface 1015. Calibration performed by the tracking module 1060 also accounts for information received from the IMU 1010 in the HMD 1000 and/or an IMU included in the I/O interface 1015, if any. Additionally, if tracking of the HMD 1000 is lost, the tracking module 1060 may re-calibrate some or all of the AR/VR system 1050.

The tracking module 1060 may track movements of the HMD 1000 or of the I/O interface 1015, the IMU 1010, or some combination thereof. For example, the tracking module 1060 may determine a position of a reference point of the HMD 1000 in a mapping of a local area based on information from the HMD 1000. The tracking module 1060 may also determine positions of the reference point of the HMD 1000 or a reference point of the I/O interface 1015 using data indicating a position of the HMD 1000 from the IMU 1010 or using data indicating a position of the I/O interface 1015 from an IMU included in the I/O interface 1015, respectively. Furthermore, in some embodiments, the tracking module 1060 may use portions of data indicating a position or the HMD 1000 from the IMU 1010 as well as representations of the local area from the DCA 1011 to predict a future location of the HMD 1000. The tracking module 1060 provides the estimated or predicted future position of the HMD 1000 or the I/O interface 1015 to the processing module 1065.

The processing module 1065 may generate a 3D mapping of the area surrounding some or all of the HMD 1000 ("local area") based on information received from the HMD 1000. In some embodiments, the processing module 1065 determines depth information for the 3D mapping of the local area based on information received from the DCA 1011 that is relevant for techniques used in computing depth. In various embodiments, the processing module 1065 may use the depth information to update a model of the local area and generate content based in part on the updated model.

The processing module 1065 executes applications within the AR/VR system 1050 and receives position information, acceleration information, velocity information, predicted future positions, or some combination thereof, of the HMD 1000 from the tracking module 1060. Based on the received information, the processing module 1065 determines content to provide to the HMD 1000 for presentation to the user. For example, if the received information indicates that the user has looked to the left, the processing module 1065 generates content for the HMD 1000 that mirrors the user's movement in a virtual environment or in an environment augmenting the local area with additional content. Additionally, the processing module 1065 performs an action within an application executing on the console 1090 in response to an action request received from the I/O interface 1015 and provides feedback to the user that the action was performed. The provided feedback may be visual or audible feedback via the HMD 1000 or haptic feedback via the I/O interface 1015.

In some embodiments, based on the eye tracking information (e.g., orientation of the user's eyes) received from the eye tracking system 1014, the processing module 1065 determines resolution of the content provided to the HMD 1000 for presentation to the user on the electronic display 1025. The processing module 1065 may provide the content to the HMD 1000 having a maximum pixel resolution on the electronic display 1025 in a foveal region of the user's gaze. The processing module 1065 may provide a lower pixel resolution in other regions of the electronic display 1025, thus lessening power consumption of the AR/VR system 1050 and saving computing resources of the console 1090 without compromising a visual experience of the user. In some embodiments, the processing module 1065 can further use the eye tracking information to adjust where objects are displayed on the electronic display 1025 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A diffraction grating comprising a substrate and a plurality of fringes supported by the substrate and running parallel to each other in a first direction, wherein:
   a refractive index of a material of the plurality of fringes is anisotropic, whereby a refractive index contrast of the diffraction grating is anisotropic; and
   the material comprises a uniaxial birefringent material having an optic axis parallel to the substrate.

2. The diffraction grating of claim 1, wherein fringes of the plurality of fringes extend at an acute angle to the substrate.

3. The diffraction grating of claim 1, wherein the substrate is transparent for visible light.

4. A diffraction grating comprising a substrate and a plurality of fringes supported by the substrate and running parallel to each other in a first direction, wherein:
   a refractive index of a material of the plurality of fringes is anisotropic, whereby a refractive index contrast of the diffraction grating is anisotropic; and
   the material comprises a uniaxial birefringent material having an optic axis forming an acute angle with the first direction.

5. A pupil-replicating waveguide comprising:
   a substrate for propagating image light therein; and
   a diffraction grating coupler supported by the substrate for in-coupling or out-coupling the image light, the diffraction grating coupler comprising a plurality of fringes running parallel to each other in a first direction, wherein:
   a refractive index of a material of the plurality of fringes is anisotropic, whereby a refractive index contrast of the diffraction grating coupler is anisotropic; and
   the material comprises a birefringent material having an optic axis forming an acute angle with the first direction.

6. The pupil-replicating waveguide of claim 5, wherein the material is at least one of a liquid crystal material or a birefringent crystal.

7. The pupil-replicating waveguide of claim 5, wherein the material comprises nematic liquid crystals.

8. The pupil-replicating waveguide of claim 5, wherein the material comprises a birefringent crystal selected from a group consisting of lithium niobate, silicon carbide, or rutile.

9. The pupil-replicating waveguide of claim 5, wherein fringes of the plurality of fringes extend from the substrate at an acute angle thereto.

10. The pupil-replicating waveguide of claim 9, further comprising a layer filling gaps between the fringes of the plurality of fringes.

11. A pupil-replicating waveguide comprising:
a substrate for propagating image light therein; and
a diffraction grating coupler supported by the substrate for in-coupling or out-coupling the image light, the diffraction grating coupler comprising a plurality of fringes running parallel to each other in a first direction, wherein:
a refractive index of a material of the plurality of fringes is anisotropic, whereby a refractive index contrast of the diffraction grating coupler is anisotropic; and
the material comprises a birefringent material having an optic axis parallel to the substrate.

12. A near-eye display (NED) comprising:
an image source for providing image light carrying an image in angular domain;
a pupil-replicating waveguide optically coupled to the image source and configured to provide the image light to an eyebox of the NED, the pupil-replicating waveguide comprising:
a substrate for propagating the image light therein; and
a diffraction grating coupler supported by the substrate for in-coupling or out-coupling the image light, the diffraction grating coupler comprising a plurality of fringes running parallel to each other in a first direction, wherein:
a refractive index of a material of the plurality of fringes is anisotropic, whereby a refractive index contrast of the diffraction grating coupler is anisotropic; and
the material comprises a uniaxial birefringent material having an optic axis forming an acute angle with the first direction.

13. The NED of claim 12, wherein fringes of the plurality of fringes extend from the substrate at an acute angle thereto.

14. The NED of claim 12, wherein the pupil-replicating waveguide further comprises a layer filling gaps between the fringes of the plurality of fringes.

* * * * *